United States Patent [19]

Backhaus et al.

[11] Patent Number: 4,811,336
[45] Date of Patent: Mar. 7, 1989

[54] SWITCHING ARRANGEMENT FOR COMMUNICATION OF DIGITAL SIGNALS, IN PARTICULAR PCM SIGNALS

[75] Inventors: Martin Backhaus; Werner Ahrens; Hartmut Lubcke, all of Paderborn, Fed. Rep. of Germany

[73] Assignee: Nixdorf Computer AG, Paderborn, Fed. Rep. of Germany

[21] Appl. No.: 2,338

[22] Filed: Jan. 9, 1987

[30] Foreign Application Priority Data

Feb. 17, 1986 [DE] Fed. Rep. of Germany ....... 3604966

[51] Int. Cl.$^4$ .............................................. H04J 3/06
[52] U.S. Cl. ........................................ 370/67; 370/88
[58] Field of Search ..................... 370/67, 87, 85, 89, 370/58, 65, 66, 88

[56] References Cited

U.S. PATENT DOCUMENTS

| | | | |
|---|---|---|---|
| 3,925,621 | 12/1975 | Collins et al. | 370/88 |
| 4,069,399 | 1/1978 | Barrett et al. | 370/67 |
| 4,078,228 | 3/1978 | Miyazaki | 370/86 |
| 4,161,786 | 7/1979 | Hopkins et al. | 370/94 |
| 4,500,991 | 2/1985 | Lubcke et al. | 370/105 |
| 4,581,733 | 4/1986 | Sarson et al. | 370/67 |
| 4,627,050 | 12/1986 | Johnson et al. | 370/89 |

Primary Examiner—A. D. Pellinen
Assistant Examiner—Geoffrey S. Evans
Attorney, Agent, or Firm—Cullen, Sloman, Cantor, Grauer, Scott & Rutherford

[57] ABSTRACT

An improved switching apparatus, having group couplers (30) and a loop arrangement (6) including a plurality of single loop lines, for communication of digital signals, particularly PCM signals, each comprising several bits at a fixed transmission rate to or from connection circuits (35, 36) connected to a plurality of group buses (31, 32) on each of which digital signals can be transmitted in parallel in a predetermined number of time compartments in cyclic repetition in pulse frames. The group buses (31, 32) are connectable by way of a respective one of the group couplers (30) to the line segments (25, 26) of a respective main bus associated with one of the main couplers (13, 14) connected to segments (7, 87) of the central loop arrangement (6). The two line segments (25, 26) of each main bus serve to transmit digital signals in different directions. This improved apparatus considerably expands the connection facilities for the several connection circuits over earlier switching apparatus employing group couplers and a loop arrangement.

22 Claims, 3 Drawing Sheets

SWITCHING ARRANGEMENT FOR COMMUNICATION OF DIGITAL SIGNALS, IN PARTICULAR PCM SIGNALS

TECHNICAL FIELD

This invention relates to switching apparatus, having group couplers and a loop arrangement including a plurality of single loop lines, for communication of digital signals, particularly PCM signals, at a fixed transmission rate to or from connection circuits connected to a plurality of group buses on each of which parallel digital signals can be transmitted in a predetermined number of time compartments in cyclic repetition in pulse frames.

BACKGROUND ART

One kind of known switching arrangement or apparatus is described in commonly assigned U.S. Pat. No. 4,500,991, granted Feb. 18, 1985 and entitled "Circuit Arrangement For the Control of the Transmission of Digital Signals, Particularly PCM Signals, Between Stations of A Time Division Multiplex Telecommunication Network...", which patent is hereby incorporated by reference, and which corresponds to German Pat. No. 2,915,488. In such an arrangement, it has been found that occasionally the facilities of connection for the several connection circuits, which may be subscriber circuits and office relays, are too sharply limited. Also, the communication capacity of this switching arrangement has sometimes been considered inadequate, which has provided a motive for enlarging the switching arrangement.

To enhance the communication capacity of a switching arrangement of the kind initially referred to, it might first occur to one to replace the loop arrangement interconnecting the several loop buses by a coupling network. Coupling networks for time multiplex communications systems are known in considerable numbers (NTTZ 1970, No. 9, pages 465 to 471). The known coupling networks comprise space and time stages in various combinations. A disadvantage of using such coupling networks to enhance the initially considered switching arrangement, however, is that the existing circuit structure presupposed by the switching arrangement would have to be completely altered.

There is also known a digital communications system with divided control (Der Fernmelde-Ingenieur, No. 6, June 1984) in which use is made of a coupling network consisting of individual coupling blocks. To expand this communications system, corresponding coupling stages are provided. A disadvantage here is that depending on load condition of the communications system, differing transit times may occur within the communications system for a given route.

A main object of the present invention is to further develop the initially specified switching arrangement such that connection facilities for the several connection circuits are expanded, and such that the communications capacity of the switching arrangement is expandable in accordance with the needs or desires of the situation presented by a given case.

SUMMARY OF THE INVENTION

The object stated above is accomplished according to the present invention by an improved switching arrangement or apparatus for communication of digital signals of n bits each (for example 8), in particular pulse code modulated (PCM) signals, at a fixed transmission rate (for example 8 kbits/second) to or from connection circuits which are each connected to one of a plurality of group buses on each of which parallel digital signals of n bits each can be transmitted in a total of m×n time compartments in cyclic repetition in pulse frames, where m is a preassigned whole number (for example 32) and n is the number of bits associated with one digital signal. The apparatus has a plurality of group couplers and a loop arrangement including a plurality of single loop lines each provided with first and second connected segments and the first and second segments and the group buses are connectable to one another through the group couplers. In the first embodiment of the present invention, the improvement comprises in combination: a plurality of main couplers each being connected to the first and second segments of the loop arrangement and connectable to first and second line segments of a respective main bus associated with each main coupler, the first and second line segments of each main bus serving to transmit digital signals in different directions, and wherein each group coupler is associated with one of the main couplers and is connectable to the line segments associated therewith.

In this basic embodiment, the invention offers the advantage that the connection facilities for the several connection circuits are considerably expanded compared to the known circuit arrangement initially considered. This is achieved in practice through the multistage structure of the bus system used, in which the loop arrangement is always incorporated.

In a second embodiment of the improved switching apparatus of the invention, the loop arrangement further includes a central timing loop for carrying timing and synchronizing pulses, which is provided with first and second connected segments respectively associated with the first and second segments of the loop arrangement. The first segment of the central timing loop is connectable to a timing pulse source. The apparatus of this second embodiment further includes a plurality of first timing lines connecting the first and second segments of the central timing loop to the main couplers and a plurality of second timing lines for providing timing signals between the group couplers and the connection circuits. An advantage which results from this second embodiment is that pulse synchronized processing of the several digital signals is ensured in a comparatively simple manner.

In a third embodiment of the improved switching apparatus of the present invention, the followig features are added to the second embodiment. Each main coupler has an additional timing loop provided with an input connected to the first segment of the central timing loop. Each additional timing loop is also provided with a pair of the first timing lines associated with the first and second line segments of the associated main bus and is connectable to the second timing lines through the associated group coupler. An advantage resulting from this third embodiment is that a comparatively small overall outlay of circuitry is required to ensure the pulse synchronized processing of the digital signals which are supplied to the several group couplers and/or received from them.

In a fourth embodiment of the improved switching apparatus of the invention, the following features are added to the second embodiment. Each main coupler has an additional timing loop formed from one of the first timing lines and provided with an input connected to the first segment of the central timing loop, a first segment for supplying timing pulses, and a second segment for returning timing pulses connectable through the associated group coupler to one of the second timing lines leading to at least one associated connection circuit arranged for sending digital signals. Each main coupler also has another one of the first timing lines connectable through the associated group coupler to another one of the second timing lines leading to at least one associated connection circuit arranged for receiving digital signals. An advantage of this fourth embodiment is that the pulse synchronized processing of the digital signals to be supplied to the several group couplers and/or picked up from them becomes practically independent of line lengths.

A fifth embodiment of the present invention has additional elements which can be incorporated into any of the aforementioned embodiments of the invention. In the fifth embodiment, each loop line of the loop arrangement in the improved switching apparatus is operatively arranged such that digital signals of at least n bits each can be transmitted in pulse frames occurring in cyclic repetition in a predetermined whole number p (for example 32) of successive time compartments from its first segment to its second segment. Also, each main coupler has first exchange means for transferring in an outgoing direction to the first segments of the single loop lines of the loop arrangement via the associated group coupler digitals signals from at least one associated connection circuit arranged for sending such digital signals, the first exchange means including parallel-to-serial conversion means and a space-time stage connected thereto, and second exchange means for transferring in an incoming direction from the second segments of the single loop lines of the loop arrangement via the associated group coupler digital signals to be transmitted by at least one associated connection means arranged for receiving such digital signals, the second exchange means including a space-time stage and serial-to-parallel means connected thereto.

An advantage which results from the fifth embodiment is that a comparatively small overall outlay of circuitry is required for considerable expansion of the communication capacity of the loop arrangement and hence of the system as a whole, since a corresponding number of loops are provided for the loop arrangement. This advantage becomes especially clear when a subsequent expansion of the capacity of the system is contemplated.

The sixth embodiment of the present invention adds to the fifth embodiment in the followig manner. In each main coupler of the switching apparatus of the sixth embodiment, the first exchange means further includes an inverter and first and second registers arranged in series between the serial-to-parallel conversion means and the first line segment of the associated main bus. The outputs of the first register are connected to the serial-to-parallel conversion means and the inputs of the second register are connected to the first line segment. The first segment of the central timing loop is connected by one of the first timing lines directly to the space-time stage, the serial-to-parallel conversion means, the first register and the inverter, and through the inverter and the additional timing loop to the second register, in order to provide timing signals thereto. The second exchange means further includes a third register arranged between the parallel-to-serial-conversion means and the second line segment of the associated main bus, and the second segment of the central timing loop is connected to the space-time stage and the parallel-to-serial conversion means in order to provide timing signals thereto, and the ouput of the inverter is connected to the third register in order to provide timing signals thereto. The advantage which results from the sixth embodiment is that there is an especially low overall outlay of circuitry required to implement the main couplers.

In a seventh embodiment of the switching apparataus of the present invention, the loop lines of the loop arrangement and the central timing loop are each of such length that the digital signals and timing pulses respectively transmitted thereover experience a transit time corresponding to a maximum phase shift of 180 degrees as determined with reference to the digital signals and timing pulses respectively delivered to them. The advantage of the seventh embodiment is that secure or reliable operation of the entire switching apparatus is facilitated for any appreciable, that is reasonable, length of the loop arrangement. As will become apparent later, the length of the loop in question may be up to 40 meters at ordinary PCM signal frequencies.

The eighth embodiment of the invention adds to the fifth embodiment. In the eighth embodiment, in each main coupler the first exchange means further includes first and second registers arranged in series between the serial-to-parallel conversion means and the first line segment of the associated main bus. Also, the first segment of the central timing loop is connected by one of the first timing lines directly to the space-time stage, the serial-to-parallel conversion means, the first register and through the additional timing loop to the second register to provide timing signals thereto. Moreover, the second segment of the central timing loop is connected by another one of the first timing lines to the space-time stage and the serial-to-parallel conversion means of the second exchange means to provide timing signals thereto. An advantage of the eighth embodiment is that there is an especially low overall outlay of circuitry for an alternative embodiment of the main coupler.

Integrated storage time switch circuits may be used if desired in those of the foregoing embodiments of the present invention which require space-time stages in their main couplers. This constitutes the ninth embodiment of the invention, and has the advantage that an especially low overall outlay is accordingly required for the space-time stages in each main coupler.

A tenth embodiment of the invention builds upon the fifth embodiment of the present invention by providing the following additional features. In the first exchange means of each main coupler, the space-time stage has x inputs and the parallel-to-serial conversion means has n inputs and x outputs and is operatively arranged such that digital signals presented in parallel to the n inputs of the parallel-to-serial conversion means are successively delivered as serial words of n bits each to the x inputs of the space-time stage connected thereto. Also, in the second exchange means of each main coupler, the space-time stage has x outputs and the serial-to-parallel conversion means has x inputs and n outputs and is operatively arranged such that serial digital signals of n bits each presented by the space-time stage to the x inputs of the serial-to-parallel conversion means are converted to digital signals occurring in parallel on the n outputs thereof, and wherein x is a positive whole number satisfying the condition that x is less than or equal to n. The tenth embodiment affords the advantage of parallel-to-serial and serial-to-parallel conversion means of especially simple construction.

DETAILED DESCRIPTION OF THE PREFERRED EMBODIMENTS

With reference to the drawings, the embodiments of the invention described above will be further illustrated below by way of example.

Figure 1:
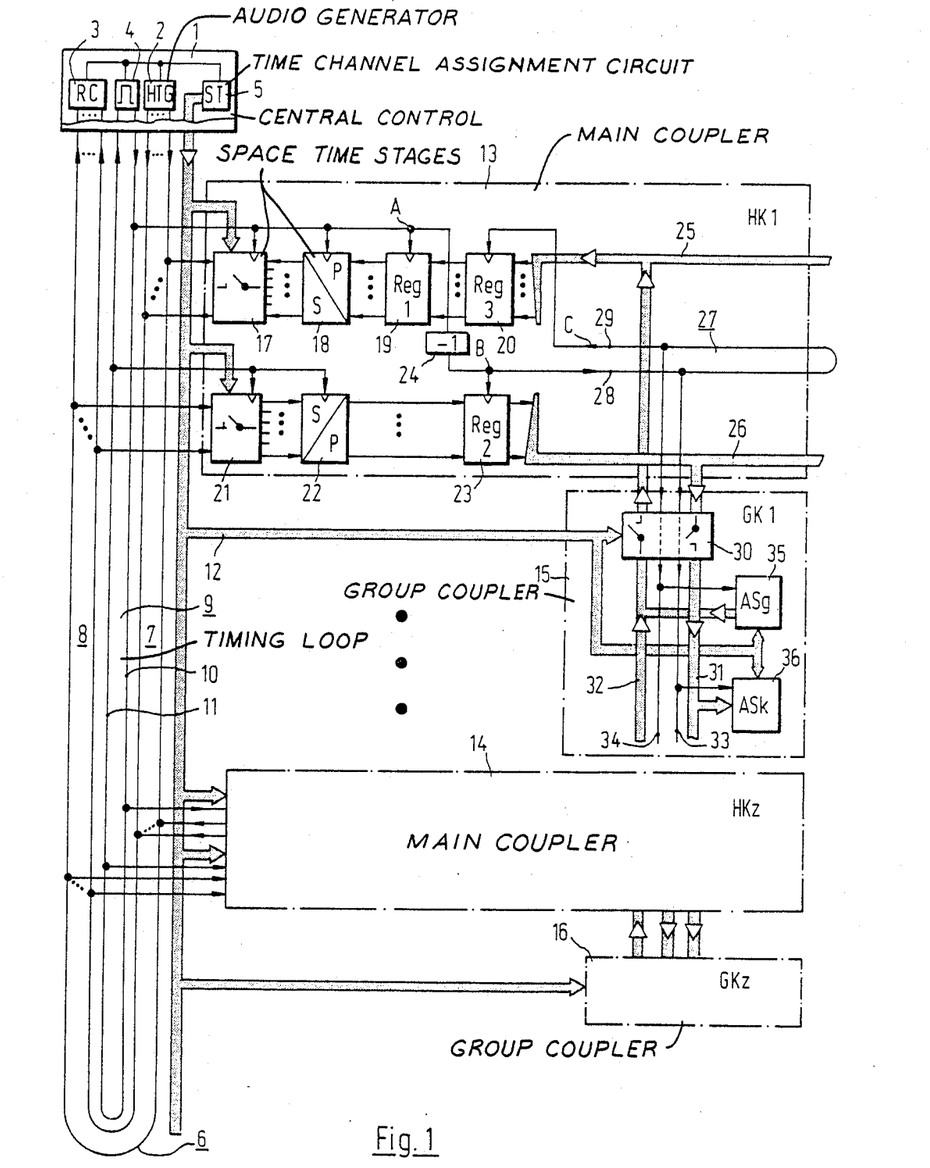
FIG. 1 shows an embodiment of the switching arrangement according to the invention by way of example.

The switching arrangement or apparatus represented in FIG. 1 comprises a central control means 1, which—like the known switching arrangement initially contemplated—comprises audio generators (HTG) 2, receiving means (RC) 3, a timing pulse source 4 delivering timing and synchronizing signals, and a time channel assignment circuit 5 assigning the time channel or compartment used within cyclically recurring pulse frames for given routes to the several units. The units 2 to 5 in question may, as indicated in FIG. 1, be interconnected by way of a line arrangement.

To the central control means 1 is connected a loop arrangement 6 comprising a plurality of individual loops, for example eight individual loops, each having a first segment 7 and a second segment 8 connected thereto. The operation of the several loops of the loop arrangement 6 is such that a definite number P) (for example 32) of time compartments of n (=8) bits each are each defined upon them in successive pulse frames cyclically repeated. This coresponds to the customary flow of data on a 2.048 MHx PCM transmission line. The audio generators 2 may assume the same functions with respect to the receiving means 3 as do the corresponding units in the known switching arrangement initially contemplated. The number of loops and/or of time compartments occurring per pulse frame may be greater than specified above when a higher traffic capacity is called for.

Besides the central loop arrangement 6 considered above, in FIG. 1 a central timing loop 9 is provided comprising a first segment 10 and a second segment 11 connected therewith. Segment 10 of this central timing loop picks up the timing pulses delivered by the timing pulse source 4, and segment 11 delivers the timing pulses in question to a signal sink or monitor circuit in the timing pulse source 4. The central timing loop 9 with its loop segments 10 and 11 is associated with the segments 7 and 8 of the central loop arrangement 6, and in practice, is preferably topologically associated as well. This ensures that signals occurring on the segments associated with each other in a given case will have the same velocities of propagation.

Besides the line arrangements discussed above, an omnibus line 12 is provided in FIG. 1 as well, by way of which information is conveyed from the time channel or compartment assignment system 5 to the several units to be controlled through the time compartments or channels to be utilized in given case. This will be further discussed later on.

The switching arrangement represented in FIG. 1 further comprises main couplers (HK1 to HKz) 13, 14, of which a plurality, for example eight, may be provided, and which are connected to various locations on the segments of the central loop arrangement 6 and the central timing loop 9. To each of the main couplers 13, 14, in FIG. 1 at least one group coupling means (GK1, GKz) 15, 16 is connected, each containing a group coupler. These group coupling means may be groups of connections such as those that are connected by way of group couplers to the loop provided in the known switching arrangement initially considered.

Now the main coupler 13 will be considered more closely. It comprises two space-time stages 17, 21, each of which may preferably be composed of integrated storage time switch arrangements such as are commercially available (for example) from the firm of Siemens AG under the trade designation PEB 2070. The space-time stage 17 is connected on its output side to the segments 7 of the central loop arrangement 6. The stage 17 in question is connected on its input side to x outputs (where x is less than or equal to n) of a parallel-to-serial conversion means 18, which is connected on its input side to the output of a first register (Reg 1) 19. This register 19 is connected on its input side to the outputs of another register (Reg 3) 20, which is connected on its input side to segment 25 of a main bus. Besides the segment 25 in question, this main bus includes an additional segment 26 thus enabling digital signals to be transmitted bidirectionally on the main bus, as may be required in any given case.

The other space-time stage, stage 21, is connected on its input side to segments 8 of the central loop arrangement 6. On its output side, stage 21 is connected to x inputs (where x is less than or equal to n) of a series-parallel conversion means 22, which is connected on its output side to the said other segment 25 of the main bus, comprised of segments 25 and 26, and associated with the main coupler 13.

The space-time stages 17 and 21 of the main coupler 13 are connected by control inputs to the omnibus line 12. By way of this line 12, the space-time stages 17, 21 receive setting information regarding the time channels or compartments to be used within pulse frames occurring in cyclic repetition for their connection to the central loop arrangement 6, and regarding the spatial relaying of signals.

The space-time stage 17, the parallel-to-serial conversion means 18 and the register 19 are connected by timing inputs to segment 10 of the central timing loop 9. By way of an inverter 24, the timing line in question is connected to the timing input of the register 23.

The timing inputs of the space-time stage 21 and of the serial-to-parallel conversion means 22 are connected to segment 11 of the central timing loop 9.

To the output of the inverting element 24 is likewise connected on segment 28 of an additional timing loop line 27 connected by a segment 29 to the timing input of the register 20. The additional timing loop 27 is associated with the main bus having the two segments 25, 26, and its two segments 28, 29 may be disposed exactly like the two segments 26, 25 of the main bus in question.

To the main bus comprising segments 25, 26 and to the additional timing loop 27, in FIG. 1, is connected the group coupling means 15, by way of a group coupler 30 having group buses 31, 32 and timing lines 33, 34 on its other connecting side. To group bus 32 and timing line 34, which latter may be connected directly to the timing line segment 29, in FIG. 1, is connected a connection circuit (ASg) 35, which is to deliver digital signals. To group bus 31 and timing line 33, of which the latter may be connected directly to the timing segment 28, is connected a connection circuit (ASk) 36 capable of picking up or receiving digital signals. The two connection circuits 35, 36 and the group coupler 30 are connected by setting inputs received from the above-mentioned omnibus line 12. The two connection circuits 35, 36 may pertain to one and the same subscriber circuit or relay means. Overall, a plurality of them are provided.

Before going on to the mode of operation of the switching arrangement represented in FIG. 1, the modification represented in FIG. 2 for the main coupler shown in detail in FIG. 1 will be discussed. The main coupler (HK) 40 represented in FIG. 2 comprises two space-time stages 41, 45, connected, similarly to the space-time stages 17, 21 of FIG. 1, to the central loop arrangement 6. The space-time stage 41 is connected on its input side to the ouput side of a parallel-to-serial conversion means 42, which in turn is connected on its inputs side to the outputs of a register (Reg 4) 43. This register 43 is connected on its input side to the outputs of another register (Reg 5) 44, which is connected on its input side to segment 25 to the main bus previously mentioned in connection with FIG. 1, to which segment 26 likewise pertains. To this segment 26, in FIG. 2, is connected the output of a serial-to-parallel conversion means 46, which is connected on its input side to the outputs of the space-time stage 45.

Figure 2:
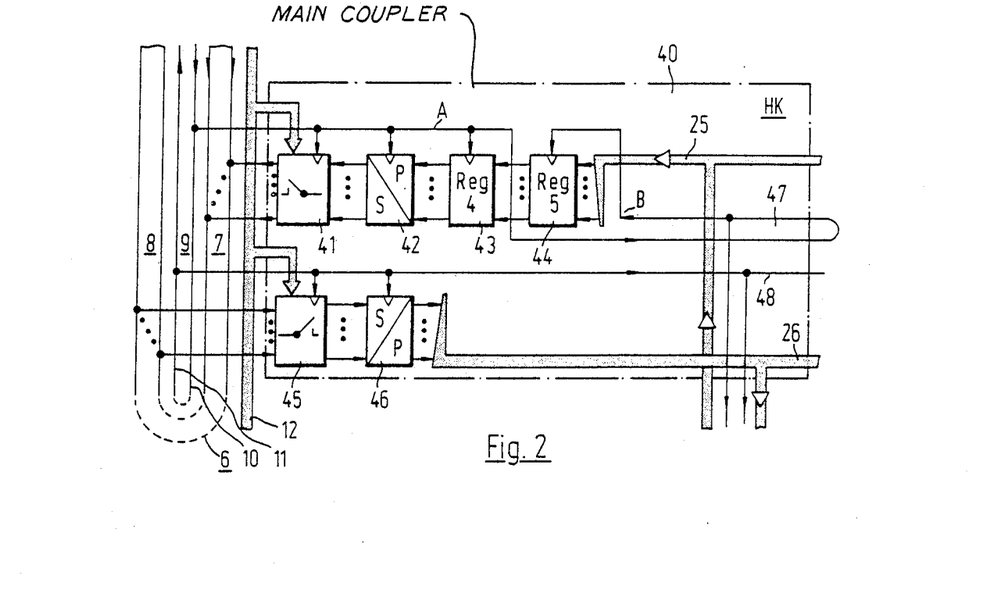
FIG. 2 shows a modification of main couplers used in the circuit arrangement according to FIG. 1.

In contrast to the situation represented in FIG. 1, in the circuit arrangement represented in FIG. 2, to the timing connection line connection to the timing inputs of the space-time stage 41, the parallel-series conversion means 42 and the register 43, is connected the signals input of another timing loop 47, which in turn is connected on its output side to the timing input of the register 44. Timing loop 47 with its two segments may be disposed just like the two segments 25, 26 of the main bus. Further, the timing line connected to the timing inputs of the space-time stage 45 and of the serial-to-parallel conversion means 46 is continued as a timing line 48. The timing pulses occurring on the return segment of the additional timing loop 47 and timing pulses occurring on timing line 48 are delivered to the current group coupling means, which is connected to the main coupler 40.

The mode of operation of the switching arrangement represented in FIGS. 1 and 2 will be described shortly. First, however, with reference to FIG. 1, it is noted that the several group coupling means, such as group coupling means 15, are so constructed that the segments of their group buses, such as segments 31 and 32, each comprise, for example, n=8 single lines, on which 8 bits belonging to one binary signal, or PCM word occur in parallel at a given time. Here provision is made so that within pulse frames cyclically repeated at a rate of 125 microseconds, m×n=256 time slots are determined in each instance on the several segments 31, 32, so that, per group coupling means, 256 different time slots, or compartments, are available in the outgoing direction of transmission and 256 slots or compartments in the incoming direction, wherein this case m is 32.

The digital signals occurring on the several lines of segment 32 of the group bus of the group coupling means 15 are supplied to a corresponding number (eight) of inputs of register 20. By this register 20, the digital signals successively occurring are taken over by timing control. Then the digital signals in question arise in register 19, from which they are successively supplied by way of the parallel-to-serial conversion means 18 to various (for example eight) inputs of the space-time stage 17. This procedure may be such that the parallel-to-serial conversion means 18 successively delivers from its various outputs serial digital signals corresponding to the parallel digital signals supplied to it on its input side. These digital signals, with their bits occurring serially, or PCM signals, are supplied by way of a space-time stage to one of the loops of segment 7 of the central loop arrangement 6. In stage 17, accordingly, there occurs a spatial and a temporal conversion of the digital signal, such as a PCM signal, supplied to it at a given time. The digital or PCM signal delivered by the space-time stage then occurs as a signal comprising for example eight bits in one time compartment out of for example 32 compartments in a pulse frame prevailing on the particular loop of the central loop arrangement 6.

The bits of digital signals, or PCM signals, occurring serially on segments 8 of the several loops—which may for example be eight in number—of the central loop arrangement 6 are picked up at the scheduled times by the time stages, corresponding to space-time stage 21, of the main coupler. The digital signals picked up by space-time stage 21 then arrive at several (for example eight) inputs of the serial-to-parallel conversion means 22 connected therewith, which thereupon forwards the digital signals, converted into parallel form, by way of for example eight parallel lines to register 23. Register 23 forwards the digital signals in question to segment 26 of the associated main bus.

In the switching arrangement represented in FIG. 2, processes entirely corresponding in principle to those explained above with reference to FIG. 1 take place. The only essential difference between the switching arrangement represented in FIG. 2 and that represented in FIG. 1 consists merely in that the switching arrangement represented in FIG. 2 dispenses with any register corresponding to the register 23 and inverter 24 of FIG. 1.

A common feature of the switching arrangement represented in FIGS. 1 and 2 is that the digital or PCM signals are transmitted in parallel on segments 25, 26 of the main bus in question and that they occur as serial digital or PCM signals on segments 7, 8 of the several loops of the central loop arrangement 6. If in this context we consider a connection from one connection circuit delivering digital or PCM signals, such as connection circuit 35, to a connection circuit picking up or receiving such signals, such as connection circuit 36, then the switching arrangement illustrated turns out to be an exchange switching system in which we have first a time stage (in the group coupling means 15 comprising connection circuit 35), then a space and time stage (in stage 17), then a space-time stage (in stage 21), and finally a time stage again in group coupling means 15 with connection circuit 36. Overall, this requires three different time compartments or channels: one time compartment or channel on segment 32, 25, one time compartment or channel on one of the loops of the central loop arrangement 6, and one time compartment or channel on segment 26, 31.

Figure 3:
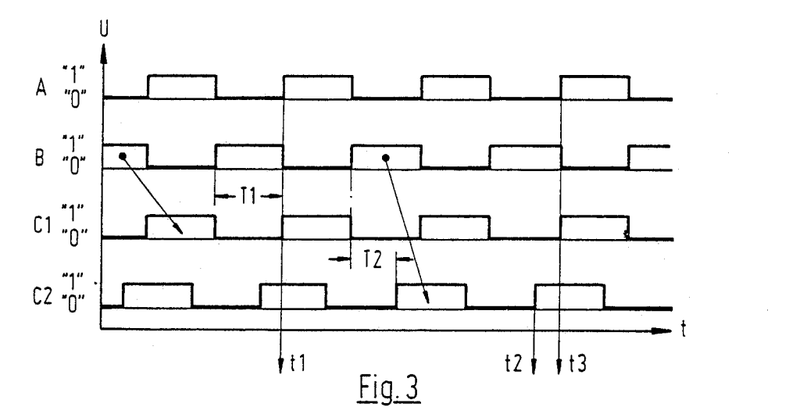
FIG. 3, in a pulse diagram, illustrates the form of pulses at various switch points in the switching arrangement of FIG. 1.
Figure 4:
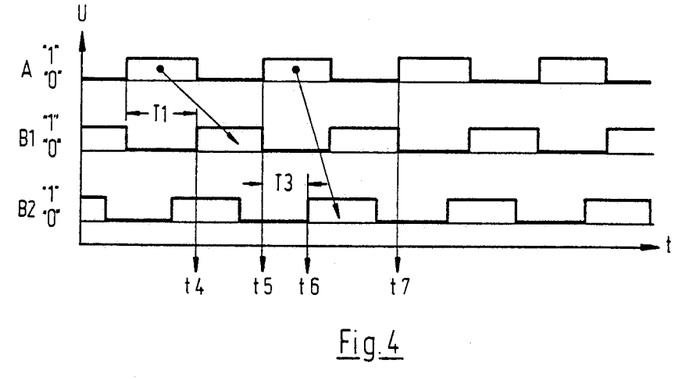
FIG. 4, in a pulse diagram, illustrates the form of pulses at various switch points in the switching arrangement represented in FIG. 2.

In the mode of operation of the switching arrangements represented in FIGS. 1 and 2 as just outlined, the situation with respect to the timing control of the several units has been disregarded for the sake of simplicity. The timing situation in question is illustrated in Figs. 3 and 4. FIGS. 3 and 4 thus illustrate the behavior of timing signal voltages U at various switch points A, B and C in FIG. 1 and A and B in FIG. 2 as functions of time t.

FIG. 3, in the line marked A, shows the form of the timing pulses occurring at switch point A in FIG. 1, which may occur at a serial frequency of 2.048 MHz. This means that the period of these pulses is about 488 nsec. In line B, FIG. 3 shows the form of the timing pulses occurring at switch point B in FIG. 1. Line C1 illustrates the timing loop 27 is assigned a length such that there is a timing pulse delay by t1 of about 244 nsec. C2 in FIG. 3 designates timing pulses occurring at switch point C in FIG. 1 in the case where the timing loop 27 is shorter than in the case previously considered. The effects of the delays in question are indicatd in FIG. 3 by arrows between the corresponding pulse sequences.

From FIG. 3 it may be seen that between the pulse sequences represented in lines B and C1, there is a phase shift of 180°, or a time shift T1 of about 244 nsec. Between the pulse sequence represented in lines B and C2, there is a phase shift corresponding to a time interval T2 smaller than the time interval T1. Assuming a transit time of 6 nanoseconds/meter for the transmission lines used, this means a maximum length of about 40 meters for the timing loop 27 in the case B/C1. Be it noted here that the central timing loop 9 and hence the central loop arrangement 6 in FIG. 1 will be of corresponding length.

If—as FIG. 3 suggests—it is considered that the anterior flanks of the timing pulses occurring at the several switch points A,B,C serve for timing control of the several units, then it may be seen from FIG. 3 that in a situation corresponding to lines A and C1, there is a simultaneous pick-up (at t1) of the digital signals occurring on segment 25 of the main bus by register 20 and register 19, whereas in the situation corresponding to lines A and C2 in FIG. 3, there is first a pick-up of the digital signals occurring on segment 25 by register 20 (at time t2) and then a pick-up by register 19 (at time t3). In this way, phase differences between pulses prevailing on the central timing loop 9 and the "decentral" additional timing loop 27 are compensated. At the same time, this compensates for phase differences between the digital signals occurring on the central loop arrangement 6 and on the several segments of the main buses and the group buses shortly connected with them.

FIG. 4 illustrates the situation, corresponding to that previously illustrated, respecting the switching arrangement represented in FIG. 2. Here the pulse forms shown in lines A and B1 of FIG. 4 illustrate the case where the timing pulses occur at switch point B in FIG. 2 are shifted in phase from the timing pulses occurring at switch point A therein by 180° (TT1 nearly equal to 244 nsec.), as indicated by a corresponding arrow. Line B2 illustrates the timing pulses occurring at switch point B in FIG. 2 for the case where a shorter transit time (see arrow) is to be anticipated for the timing pulses occurring on timing loop 47 in FIG. 2. This transit time is indicated in FIG. 4 by T3.

From FIG. 4, then, the followig may be seen: If the timing pulses occurring on timing loop 47 in FIG. 2 suffer a delay of T1 relative to the timing pulses occurring at switch point A, then the digital signals occurring on segment 25 of the main bus of the main coupler 40 are picked up in register 44 at the time t4 and picked up by the following register 43 at a time t5. If the delay between the timing pulses occurring at switch points B and A in FIG. 2 has a duration of T3, then the digital signals occurring on segment 25 in FIG. 2 are picked up in register 44 at the time t6 and in register 43 at a time t7. In this case also, a compensation for phase differences prevailing between pulses on the central timing loop 9 and timing loop 47 is achieved. In this case also, transit time problems are solved, as they were solved in the switching arrangement represented in FIG. 1.

With reference to FIGS. 3 and 4, it may be added that in the case of the embodiment of FIG. 1, the loops of the central loop arrangement 6 and the timing loop 27, given a transit time of 6 nanoseconds/meter, may have a maximum length of about 40 meters, and that in the embodiment of FIG. 2 the lengths of the loops and timing lines are immaterial in practice for purposes of maintaining proper operation at all times in conjunction with the given main coupler and the main bus connected therewith. With the assumed transit times on the several lines, the lines of the central loop arrangement and of the central timing loop will be of corresponding lengths.

As initially mentioned, information concerning the time compartments or channels to be used from time to time is transmitted from the time channel or compartment assignment means 5 to the several units to be controlled by way of the omnibus line 12 indicated in FIGS. 1 and 2. To be able to convey this information, the time channel or compartment assigning means 5 first requires appropriate data. For this purpose, the central control unit 1, by way of separate polling channels (not explicitly shown), obtains calls from currently calling line connections. In the context of this inquiry, both the calling stations and the stations to be called, or the addresses designating these stations, are recorded. These data are then stored, together with data on the time compartments or channels assigned to the call in question, in coordination tables whose contents will serve to trigger the several units by way of the omnibus line 12. The polling means thus required and the coordination tables may therefore be part and parcel of the time channel or compartment assigning system 5.

In conclusion, it may be added that while the present invention has been illustrated in terms of switching arrangements in which the digital signals or PCM signals are transmitted serially by way of individual loops of the central loop arrangement 6, it should be noted that the subject matter of the present invention may dispense with such serial transmission of the digital signals or PCM signals if the parallel-to-serial and serial-to-parallel conversion means are eliminated.

We claim:

1. An improved switching apparatus for communication of digital signals of n bits each at a fixed transmission rate to or from connection circuits (35, 36) which are each connected to one of a pluralilty of group buses (31, 32) on each of which parallel digital signals of n bits each can be transmitted in a total of m.n time compartments in cyclic repetition in pulse frames, where m is a preassigned whole number and n is the number of bits associated with one digital signal, the apparatus having a pluralilty of group couplers (30) and a loop arrangement (6) including a plurality of single loop lines each provided with first and second connected segments, (7, 8), and wherein said first and second segments (7, 8) and the group buses (31, 32) are connectable to one another through the group couplers (30), the improvement comprising in combination:

a plurality of main couplers (13, 14; 40) each being connected to the first and second segments of the loop arrangement (6) and connectable to first and second line segments (25, 26) of a respective main bus associated with each bus serving to transmit digital signals in different directions, and wherein each group coupler (30) is associated with one of the main couplers and is connectable to the line segments associated therewith.

2. A switching apparatus according to claim 1, wherein the digital signals of n bits each are pulse code modulated signals.

3. A switching apparatus according to claim 1, wherein n has a value of 8.

4. A switching apparatus according to claim 1, wherein m has a value of 32.

5. A switching apparatus according to claim 1, wherein the fixed transmission rate is at least 8 kilobytes per second.

6. A switching aparatus according to claim 1, wherein:

the loop arrangement (6) further includes a central timing loop (9) for carrying timing and synchronizing pulses, and provided with first and second connected segments (10, 11) respectively associated with the first and second segments (8), 8 of the loop arrangement (6), the first segment of the central timing loop being connectable to a timing pulse source (4), and the apparatus further includes:

a plurality of first timing lines (28, 29, 47, 48) connecting the first and second segments of the central timing loop (9) to the main couplers (13, 14, 40), and a plurality of second timing lines (33, 34) for providing timing signals between the group couplers and the connection circuits (35, 36).

7. A switching apparatus according to claim 6, wherein each main coupler has:

an additional timing loop (27) provided with an input connected to the first segment (10) of the central timing loop (9) and provided with a pair of the first timing lines (28, 29) associated with the first and second line segments of the associated main bus and connectable to the second timing lines (33, 34) through the associated group coupler (30).

8. A switching aparatus according to claim 6, wherein each main coupler (40) has:

an additional timing loop (47) formed from one of the first timing lines, provided with an input connected to the first segment (10) of the central timing loop (9), a first segment for supplying timing pulses, and a second segment for returning timing pulses connectable through the associated group coupler (30) to one (34) of the second timing lines leading to at least one associated connection circuit arranged for sending digital signals, and another one of the first timing lines (48) connectable through the associated group coupler (30) to another one (33) of the second timing lines leading to at least one associated connection circuit arranged for receiving digital signals.

9. A switching apparatus according to claim 1, wherein each loop line of the loop arrangement is operatively arranged such that digital signals of at least n bits each can be transmitted in pulse frames occurring in cyclic repetition in a predetermined whole number of successive time compartments from its first segment (7) to its second segment (8), and each main coupler (13, 14) has first exchange means for transferring in an outgoing direction to the first segments (7) of the single loop lines of the loop arrangement (6) via the associated group coupler (3) digital signals from at least one associated connection circuit (35) arranged for sending such digital signals, the first exchange means including parallel-to-serial conversion means (18, 42) and a space-time stage (17, 41) connected thereto, and second exchange means for transferring in an incoming direction from the second segments (8) of the single loop lines of the loop arrangement (6) via the associated group coupler (30) digital signals to be transmitted by at least one associated connection means (36) arranged for receiving such digital signals, the second exchange means including a space-time stage (21, 45) and serial-to-parallel means (22, 46) connected thereto.

10. A switching apparatus according to claim 7 wherein each loop line of the loop arrangement is operatively arranged such that digital signals of at least n bits each can be transmitted in pulse frames occurring in cyclic repetition in a predetermined while number of successive time compartments from its first segment (7) to its second segment (8), and each main coupler (13, 14) has first exchange means for transferring in an outgoing direction to the first segments (7) of the single loop lines of the loop arrangement (6) via the associated group coupler (30) digital signals from at least one associated connection circuit (35) arranged for sending such digital signals, the first exchange means including parallel-to-serial conversion means (18) and a space-time stage (17) connected thereto, and second exchange means for transferring in an incomimg direction from the second segments (8) of the single loop lines of the loop arrangement (6) via the associated group coupler (30) digital signals to be transmitted by at least one associated connection means (36) arranged for receiving such digital signals, the second exchange means including a space-time stage (21) and serial-to-parallel conversion means (22) connected thereto.

11. A switching apparatus according to claim 8 wherein each loop line of the loop arrangement is operatively arranged such that digital signals of at least n bits each can be transmitted in pulse frames occurring in cyclic repetition in a predetermined whole number of successive time compartments from its first segment (7) to its second segment (8), and each main coupler (40) has first exchange means for transferring in an outgoing direction to the first segments (7) of the single loop lines of the loop arrangement (6) via the associated group coupler (30) digital signals from at least one associated connection circuit (35) arranged for sending such digital signals, the first exchange means including parallel-to-serial conversion means (42) and a space-time stage (41) connected thereto, and second exchange means for transferring in an incoming direction from the second segments (8) of the single loop lines of the loop arrangement (6) via the associated group coupler (30) digital signals to be transmitted by at least one associated connection means (36) arranged for receiving such digital signals, the second exchange means including a space-time stage (45) and serial-to-parallel conversion means (46) connected thereto.

12. A switching apparatus according to claim 10, wherein, in each main coupler (13, 14), the first exchange means further includes an inverter (24) and first and second registers (19, 20) arranged in series between the serial-to-parallel conversion means and the first line segment (25) of the associated main bus with the outputs of the first register being connected to the serial-to-parallel conversion means and the inputs of the second register being connected to the first line segment, and the first segment (10) of the central timing loop is connected by one of the first timing lines directly to the space-time stage (17), the serial-to-parallel conversion means (18), the first register (19) and the inverter, (24) and through the inverter and the additional timing loop (27) to the second register, in order to provide timing signals thereto, and the second exchange means further includes a third register (23) arranged between the parallel-to-serial conversion means (22) and the second line segment (26) of the associated main bus, and the second segment (11) of the central timing loop (9) is connected to the space-time stage (21) and the parallel-to-serial conversion means (22) in order to provide timing signals thereto, and the ouput of the inverter (24) is connected to the third register in order to provide timing signals thereto.

13. A switching apparatus according to claim 6, wherein the loop lines of the loop arrangement and the central timing loop are each of such length that the digital signals and timing pulses respectively transmitted thereover experience a transit time corresponding to a maximum phase shift of 180 degrees.

14. A switching apparatus according to claim 12, wherein the loop lines of the loop arrangement and the central timing loop are each of such length that the digital signals and timing pulses respectively transmitted thereover experience a transit time corresponding to a maximum phase shift of 180 degrees.

15. A switching apparatus according to claim 11, wherein, in each main coupler (40) the first exchange means further includes first and second registers (43, 44) arranged in series between the serial-to-parallel conversion means (41) and the first line segment (25) of the associated main bus, and the first segment (10) of the central timing loop is connected by one of the first timing lines directly to the space-time stage (41), the serial-to-parallel conversion means (42), the first register (43) and through the additional timing loop (47) to the second register (44) to provide timing signals thereto, and the second segment (11) of the central timing loop (9) is connected by another one of the first timing lines to the space-time stage (45) and the serial-to-parallel conversion means (46) of the second exchange means to provide timing signals thereto.

16. A switching apparatus according to claim 15, wherein the loop lines of the loop arrangement and the central timing loop are each of such length that the digital signals and timing pulses respectively transmitted thereover experience a transit time corresponding to a maximum phase shift of 180 degrees.

17. A switching apparatus according to claim 9, wherein the space-time stages are each composed of an integrated storage time switch circuit.

18. A switching apparatus according to claim 10, wherein the space-time stages are each composed of an integrated storage time switch circuit.

19. A switching apparatus according to claim 11, wherein the space-time stages are each composed of an integrated storage time switch circuit.

20. A switching apparatus according to claim 9, wherein:
in the first exchange means of each main coupler, the space-time stage (17, 41) has x inputs and the parallel-to-serial conversion means (18, 42) has n inputs and x outputs and is operatively arranged such that digital signals presented in parallel to the n inputs of the parallel-to-serial conversion means are successively delivered as serial words of n bits each to the x inputs of the space-time stage (17, 41) connected thereto, and
in the second exchange means of each main coupler, the space-time stage (21, 45) has x outputs and the serial-to-parallel conversion means (22, 46) has x inputs and n outputs and is operatively arranged such that serial digital signals of n bits each presented by the space-time stage (21, 45) to the x inputs of the serial-to-parallel conversion means (22, 46) are converted to digital signals occurring in parallel on the n outputs thereof, and wherein x is a positive whole number satisfying the condition that x is less than or equal to n.

21. A switching apparatus according to claim 12, wherein:
in the first exchange means of each main coupler, the space-time stage (17) has x inputs and the parallel-to-serial conversion means (18) has n inputs and x outputs and is operatively arranged such that digital signals presented in parallel to the n inputs of the parallel-to-serial conversion means are successively delivered as serial words of n bits each to the x inputs of the space-time stage (17) connected thereto, and
in the second exchange means of each main coupler, the space-time stage (21) has x outputs and the serial-to-parallel conversion means (22) has x inputs and n outputs and is operatively arranged such that serial digital signals of n bits each presented by the space-time stage (21) to the x inputs of the serial-to-parallel conversion means (22) are converted to digital signals occurring in parallel on the n outputs thereof, and wherein x is a positive whole number satisfying the condition that x is less than or equal to n.

22. A switching apparatus according to claim 15, wherein:
in the first exchange means of each main coupler, the space-time stage (41) has x inputs and the parallel-to-serial conversion means (42) has n inputs and x outputs and is operatively arranged such that digital signals presented in parallel to the n inputs of the parallel-to-serial conversion means are successively delivered as serial words of n bits each to the x inputs of the space-time stage (41) connected thereto, and
in the second exchange means of each main coupler, the space-time stage (45) has x outputs and the serial-to-parallel conversion means (46) has x inputs and n ouputs and is operatively arranged such that serial digital signals of n bits each presented by the space-time stage (45) to the x inputs of the serial-to-parallel conversion means (46) are converted to digital signals occurring in parallel on the n outputs thereof, and wherein x is a positive whole number satisfying the condition that x is less than or equal to n.

* * * * *